(12) United States Patent
Hoffman (10) Patent No.: US 6,947,517 B2
(45) Date of Patent: Sep. 20, 2005

(54) SCINTILLATOR ARRAY HAVING A REFLECTOR WITH INTEGRATED AIR GAPS

(75) Inventor: David M. Hoffman, New Berlin, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 66 days.

(21) Appl. No.: 10/248,930

(22) Filed: Mar. 3, 2003

(65) Prior Publication Data

US 2004/0174952 A1 Sep. 9, 2004

(51) Int. Cl.[7] .............................................. G01N 23/00
(52) U.S. Cl. ................ 378/19; 250/370.09; 250/370.11
(58) Field of Search ....................... 378/4, 19; 250/367, 250/368, 483.1, 370.09, 370.11; 156/247

(56) References Cited

U.S. PATENT DOCUMENTS

| | | | | |
|---|---|---|---|---|
| 4,429,227 A | * | 1/1984 | DiBianca et al. ...... 250/370.09 |
| 4,929,835 A | * | 5/1990 | Yamashita et al. .......... 250/367 |
| 5,753,921 A | * | 5/1998 | Trauernicht et al. ... 250/370.09 |
| 5,773,829 A | * | 6/1998 | Iwanczyk et al. ........... 250/367 |
| 5,799,057 A | * | 8/1998 | Hoffman et al. ............ 378/147 |
| 6,245,184 B1 | * | 6/2001 | Riedner et al. ............. 156/247 |
| 6,344,649 B2 | * | 2/2002 | Riedner et al. ............. 250/367 |

OTHER PUBLICATIONS

Butkus, B. "Nanoporous Coatings Exhibit Low Refractive Index", Photonics Spectra, Nov. 2002, p. 26.

* cited by examiner

Primary Examiner—Craig E. Church
Assistant Examiner—Irakli Kiknadze
(74) Attorney, Agent, or Firm—Ziolkowski Patent Solutions Group, SC; Michael A. Della Penna; Carl B. Horton (57) ABSTRACT

The present invention is directed to a scintillator array having an integrated air gap. By integrating an air gap within the reflector, light collection efficiency is improved while simultaneously lowering cross-talk between scintillators. That is, implementing a reflector without chromium oxide ($Cr_2O_3$) increases light reflectivity and an air gap lowers cross talk through the reflector. To further improve the reflectivity, the base reflector material may be coated with a low index material and a reflective material such as silver.

26 Claims, 6 Drawing Sheets

SCINTILLATOR ARRAY HAVING A REFLECTOR WITH INTEGRATED AIR GAPS

BACKGROUND OF INVENTION

The present invention relates generally to diagnostic imaging systems and, more particularly, to a reflector for a scintillator array having an integrated air gap. Specifically, the scintillator array is constructed such that a uniform air gap or void exists between adjacent scintillators.

Typically, in computed tomography (CT) imaging systems, an x-ray source emits a fan-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom.

Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data processing system for image reconstruction.

Scintillator arrays typically incorporate a reflector layer between adjacent scintillators to limit cross-talk between the scintillators thereby improving light collection efficiency of the corresponding photodiodes. Generally, the reflector is formed of a material comprising chromium oxide or other types of optically absorbent material. Because chromium oxide operates as a good absorbent of light, the relative reflectivity of the reflector is reduced. As such, incorporating a reflector layer that includes chromium oxide, a trade-off in CT detector design is made between lower cross talk and reflectivity. If the reflector layer is fabricated without chromium oxide or other optically absorbent materials, cross talk between scintillators increases. In contrast, implementing optically absorbent materials reduces cross talk but lowers the reflectivity of the reflector. Reduced reflectivity degrades low signal performance and increased cross talk affects spatial resolution. Low signal performance is a function of noise generated in the CT detector. As reflectivity falls the light output of the scintillator also falls. Noise, however, is relatively constant, therefore, decreases in light output increases the ratio of noise to functional light output. Additionally, known CT detectors are constructed such that the reflector material is disposed such that it fills any spaces that exist between adjacent scintillators. This also contributes to increased cross-talk between scintillators as there is a constant interface between the scintillators.

It would therefore be desirable to design a CT detector having a reflector with integrated air gaps to improve light collection efficiency and lower cross-talk between scintillators.

BRIEF DESCRIPTION OF INVENTION

The present invention is directed to a scintillator array having an integrated air gap overcoming the aforementioned drawbacks. By integrating an air gap within the reflector, light collection efficiency is improved while simultaneously lowering cross-talk between scintillators. That is, implementing a reflector without chromium oxide ($CR_2O_3$) increases light output and an air gap reduces cross talk through the reflector. To further improve the reflectivity, the reflector material may be coated with a low index material and a reflective material such as silver.

Therefore, in accordance with one aspect of the present invention, a CT detector includes a scintillator array of scintillators arranged to receive x-rays from an x-ray projector source and output light in proportion to the x-rays received. The detector further includes a cast reflector integrally disposed between adjacent scintillators. An air gap is disposed within the cast reflector such that a space or void is formed between adjacent scintillators.

In accordance with another aspect of the present invention, a CT detector having a scintillator array optically coupled to a photodiode array is provided. The CT detector is formed by creating voids between adjacent scintillators of the scintillator array and disposing a cast reflector within each of the voids. Air gaps are then created in the cast reflector disposed within the voids. A photodiode array is then coupled to the scintillator array to form a CT detector.

According to another aspect of the present invention, a CT system includes a rotatable gantry having a bore centrally disposed therein and a table movable fore and aft through the bore and configured to position a subject for CT data acquisition. The CT system further includes a high frequency electromagnetic energy projection source positioned within the rotatable gantry and configured to project high frequency electromagnetic energy toward the subject. A detector array is provided and disposed within the rotatable gantry and configured to detect high frequency electromagnetic energy projected by the projection source and impinged by the subject. The detector array includes a scintillator array having a plurality of scintillators and wherein the scintillator array includes a reflector between adjacent scintillators. The reflector is configured to have an integrated air gap. The detector array further includes a photodiode array coupled to the scintillator array and configured to produce electrical signals in response to light emitted by the scintillator array.

In accordance with yet a further aspect of the present invention, a scintillator array includes a plurality of scintillators arranged to receive x-rays and generate light in response thereto. The scintillator array further includes a reflector disposed between adjacent scintillators and a plurality of voids integrated in the reflector along at least one dimension. The reflector is formed of a material absent chromium oxide.

In accordance with another aspect of the present invention, a method of manufacturing a scintillator array includes the steps of creating voids between adjacent scintillators. The method further includes disposing a cast reflector within each of the voids and creating air gaps in the cast reflector.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The operating environment of the present invention is described with respect to a four-slice computed tomography (CT) system. However, it will be appreciated by those skilled in the art that the present invention is equally applicable for use with single-slice or other multi-slice configurations. Moreover, the present invention will be described with respect to the detection and conversion of x-rays. However, one skilled in the art will further appreciate that the present invention is equally applicable for the detection and conversion of other high frequency electromagnetic energy. The present invention will be described with respect to a "third generation" CT scanner, but is equally applicable with other CT systems.

Figure 1:
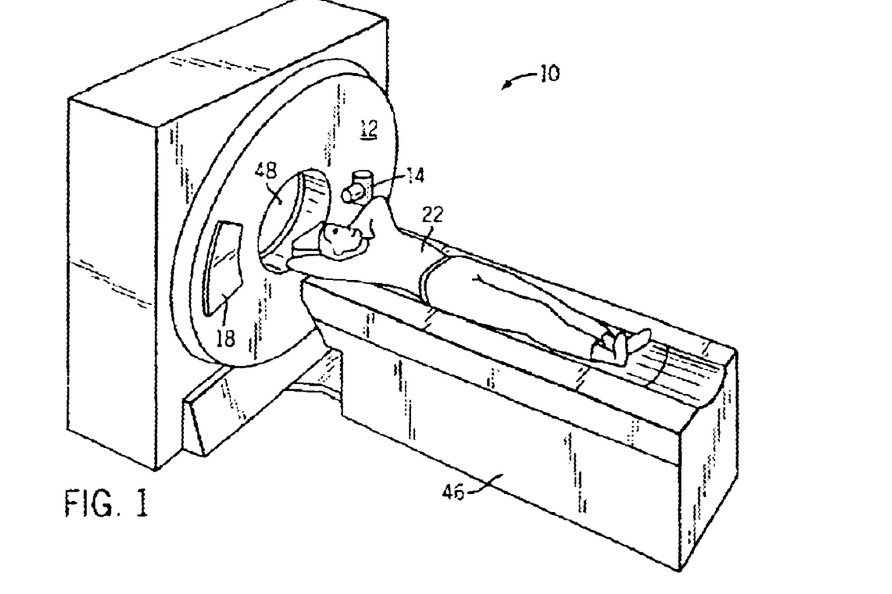
FIG. 1 is a pictorial view of a CT imaging system.
Figure 2:
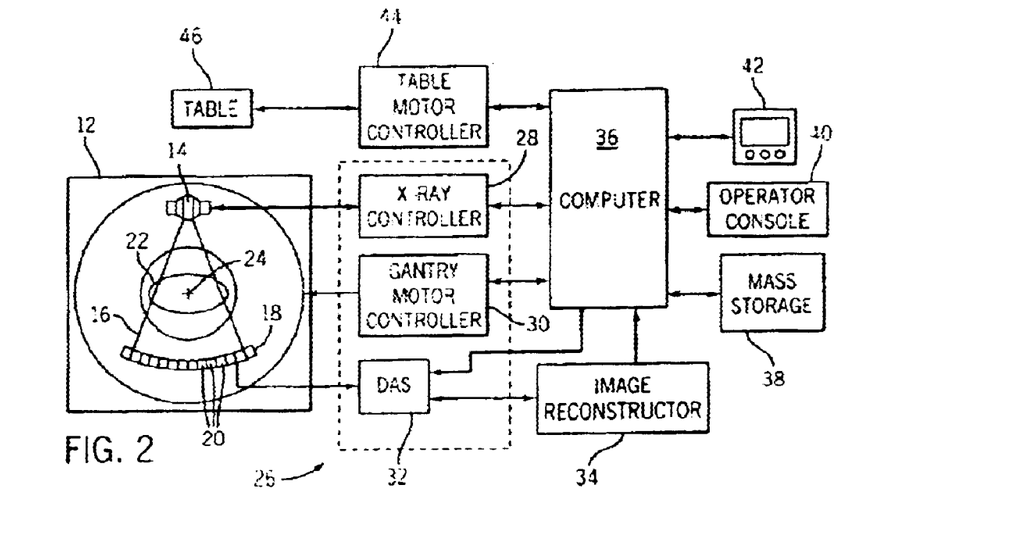
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of the gantry 12. Detector array 18 is formed by a plurality of detectors 20 which together sense the projected x-rays that pass through a medical patient 22. Each detector 20 produces an electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from detectors 20 and converts the data to digital signals for subsequent processing. An image reconstructor 34 receives sampled and digitized x ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves portions of patient 22 through a gantry opening 48.

Figures 3, 4:
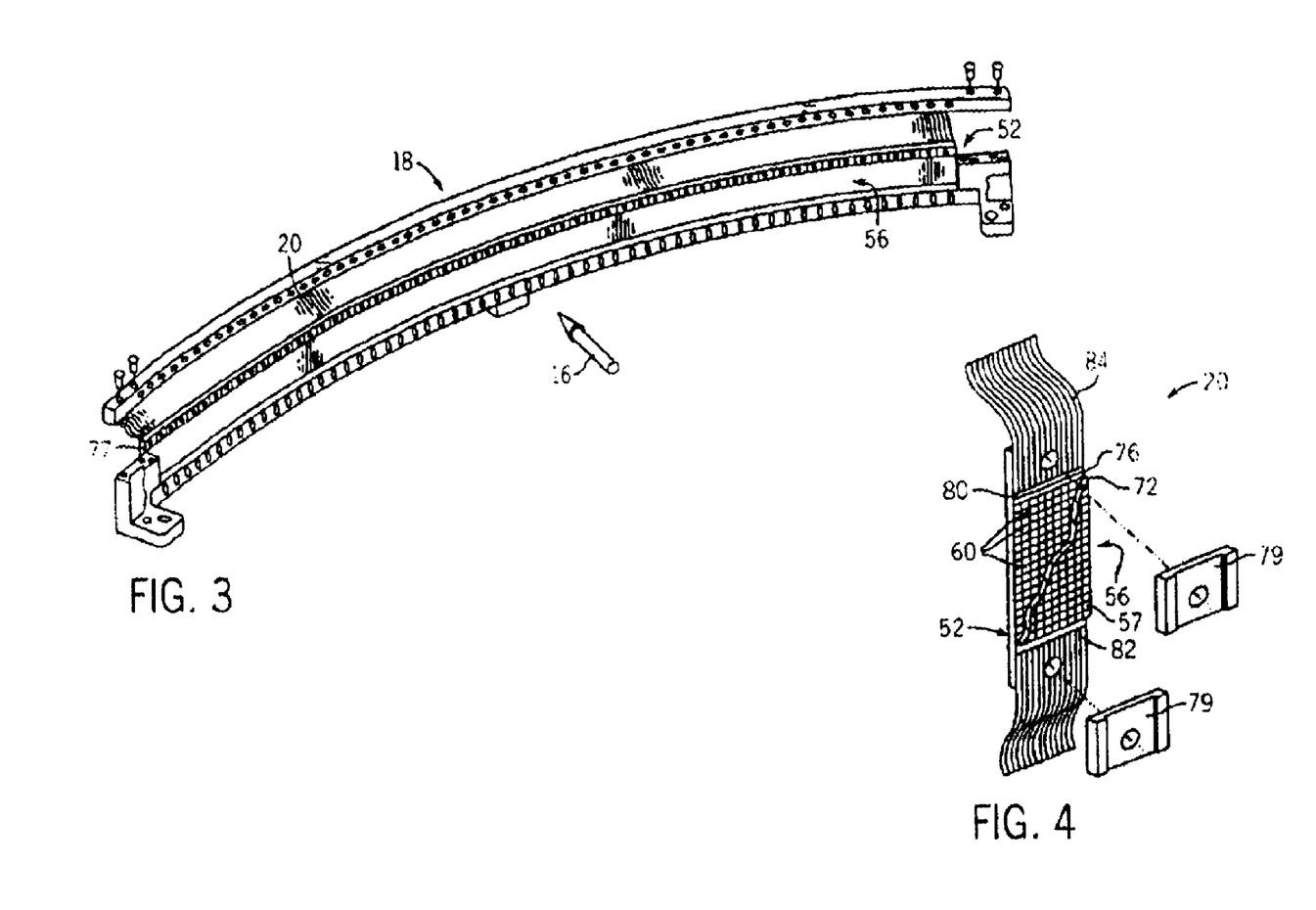
FIG. 3 is a perspective view of one embodiment of a CT system detector array.
FIG. 4 is a perspective view of one embodiment of a CT detector.

As shown in FIGS. 3 and 4, detector array 18 includes a plurality of scintillators 57 forming a scintillator array 56. A collimator (not shown) is positioned above scintillator array 56 to collimate x-ray beams 16 before such beams impinge upon scintillator array 56.

In one embodiment, shown in FIG. 3, detector array 18 includes 57 detectors 20, each detector 20 having an array size of 16×16. As a result, array 18 has 16 rows and 912 columns (16×57 detectors) which allows 16 simultaneous slices of data to be collected with each rotation of gantry 12.

Switch arrays 80 and 82, FIG. 4, are multi-dimensional semiconductor arrays coupled between scintillator array 56 and DAS 32. Switch arrays 80 and 82 include a plurality of field effect transistors (FET) (not shown) arranged as multi dimensional array. The FET array includes a number of electrical leads connected to each of the respective photodiodes 60 and a number of output leads electrically connected to DAS 32 via a flexible electrical interface 84. Particularly, about one-half of photodiode outputs are electrically connected to switch 80 with the other one-half of photodiode outputs electrically connected to switch 82. Additionally, a reflector layer may be interposed between each scintillator 57 to reduce light scattering from adjacent scintillators. Each detector 20 is secured to a detector frame 77, FIG. 3, by mounting brackets 79.

Switch arrays 80 and 82 further include a decoder (not shown) that enables, disables, or combines photodiode outputs in accordance with a desired number of slices and slice resolutions for each slice. Decoder, in one embodiment, is a decoder chip or a FET controller as known in the art. Decoder includes a plurality of output and control lines coupled to switch arrays 80 and 82 and DAS 32. In one embodiment defined as a 16 slice mode, decoder enables switch arrays 80 and 82 so that all rows of the photodiode array 52 are activated, resulting in 16 simultaneous slices of data for processing by DAS 32. Of course, many other slice combinations are possible. For example, decoder may also select from other slice modes, including one, two, and four-slice modes.

Figure 5:
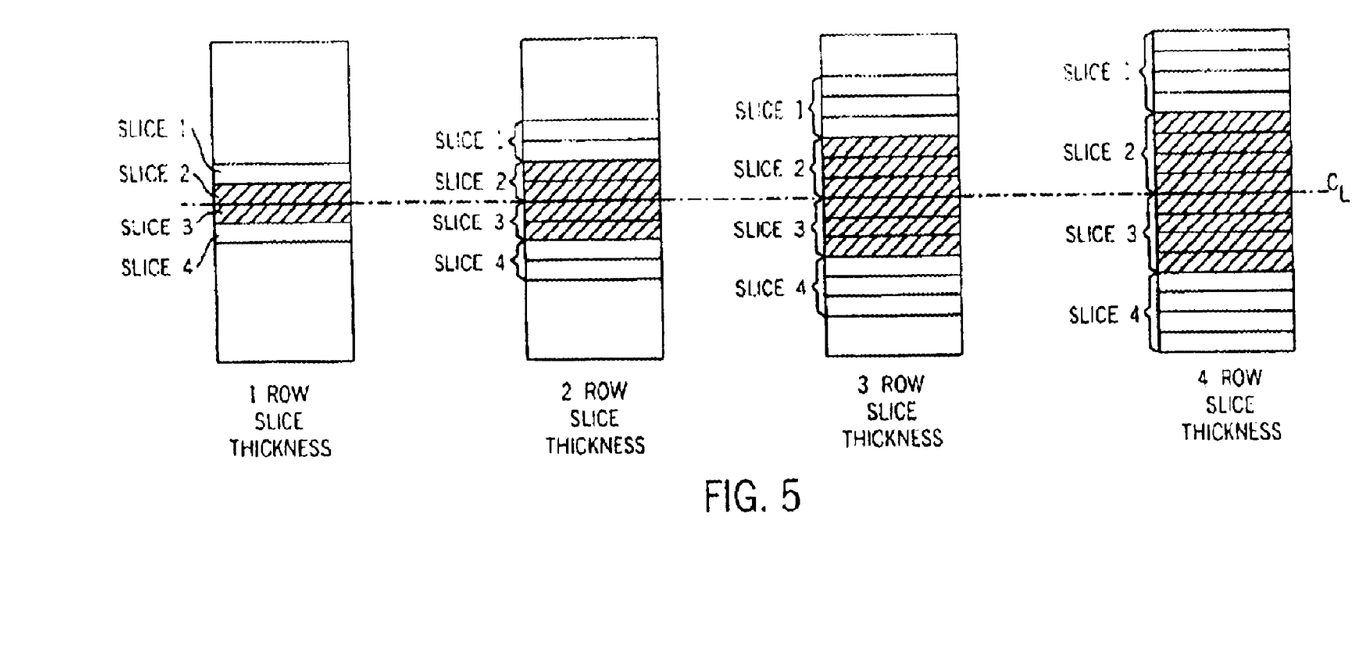
FIG. 5 is illustrative of various configurations of the detector in FIG. 4 in a four-slice mode.

As shown in FIG. 5, by transmitting the appropriate decoder instructions, switch arrays 80 and 82 can be configured in the four-slice mode so that the data is collected from four slices of one or more rows of photodiode array 52. Depending upon the specific configuration of switch arrays 80 and 82, various combinations of photodiodes 60 can be enabled, disabled, or combined so that the slice thickness may consist of one, two, three, or four rows of scintillator array elements 57. Additional examples include, a single slice mode including one slice with slices ranging from 1.25 mm thick to 20 mm thick, and a two slice mode including two slices with slices ranging from 1.25 mm thick to 10 mm thick. Additional modes beyond those described are contemplated.

Figure 6:
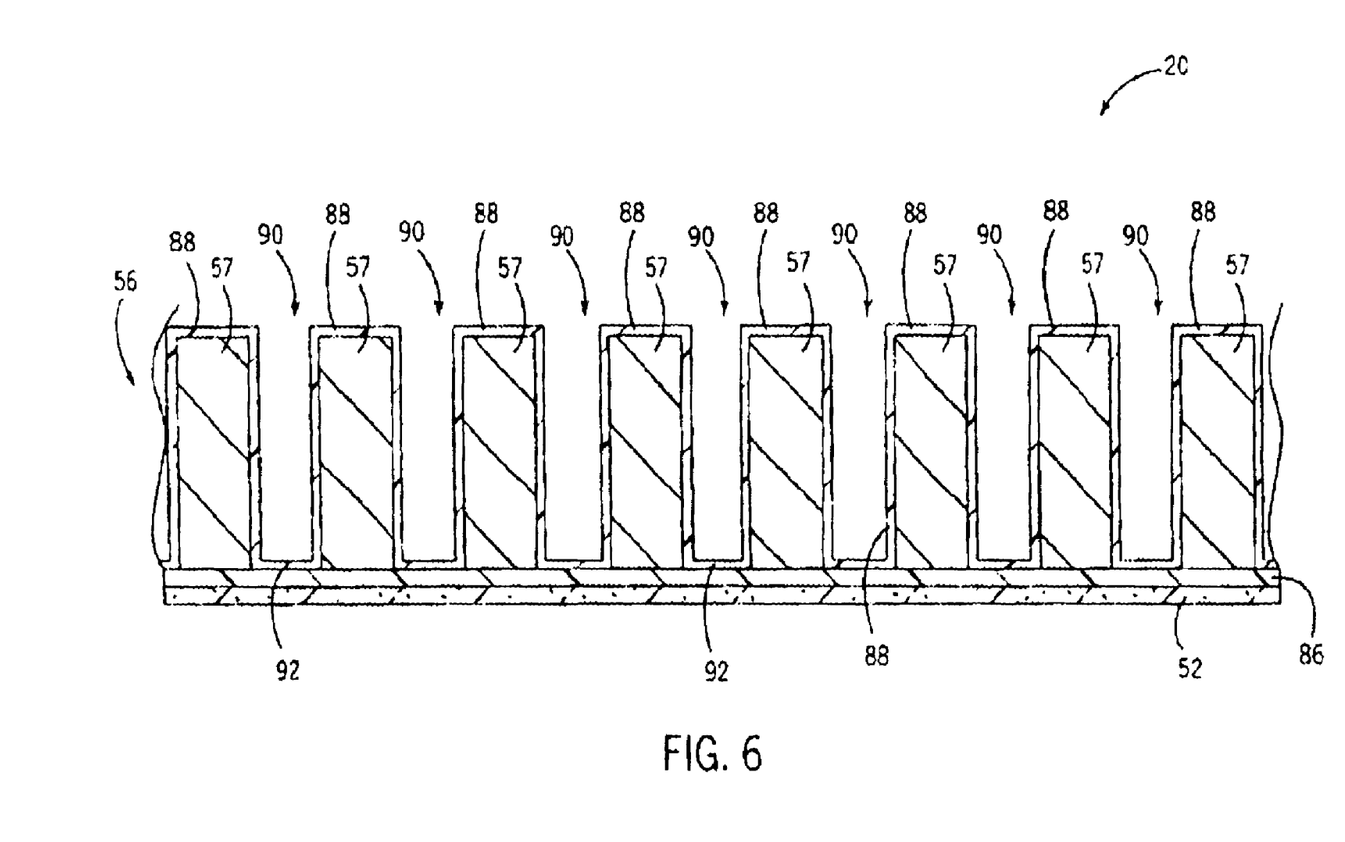
FIG. 6 is a cross-sectional schematic of a CT detector in accordance with one embodiment of the present invention.

Referring now to FIG. 6, a cross-sectional schematic of a CT detector 20 in accordance with one embodiment of the present invention is shown. CT detector 20, as described previously, includes a scintillator array 56 comprising a plurality of scintillators or scintillation elements 57. Coupled to the scintillator array 56 is a photodiode array 52. Coupling photodiode array 52 to scintillator array 56 is an optical coupler 86 that typically is in the form of an optical epoxy.

Still referring to FIG. 6, a cast reflector 88 is typically used to coat each of the scintillators 57. Preferably, the cast reflector is formed from an epoxy loaded with titanium dioxide ($TiO_2$). The cast reflector is generally opaque and is designed to prevent light emissions from each of the scintillators. That is, the cast reflector operates to confine the light generated by each of the scintillators to be within the respective scintillators. As such, light is not translated between adjacent scintillators. Since the photodiode array 52 is designed to detect light emissions from each of the scintillators 57, the cast reflector is used to improve the convergence of light toward the photodiode array 52.

The cast reflector is also designed to absorb light emissions from the scintillators to assist with preventing cross-talk between the scintillators. As such, the reflector is preferably fabricated without chromium oxide and other absorbing materials used to improve the cross-talk characteristics of the reflector. As illustrated in FIG. 6, detector 20 is further constructed such that an air gap or void 90 is formed between adjacent scintillators 57. Constructing the detector 20 in such a manner 50 as to incorporate an air gap 90 between adjacent scintillators 57 improves overall reflectivity of the reflector. As shown in FIG. 6, the air gap/reflector combination results in a U-shaped channel being formed between each of the scintillators 57. The air gap 90 is constructed such that it does not extend to the optical coupler 86. That is, the reflector 88 forms a cast bridge 92 between adjacent scintillators 57. As such, the cast reflector 88 is positioned adjacent to the optical coupler 86. However, air gap 90 may be formed so as to extend to the optical coupler.

Figure 7:
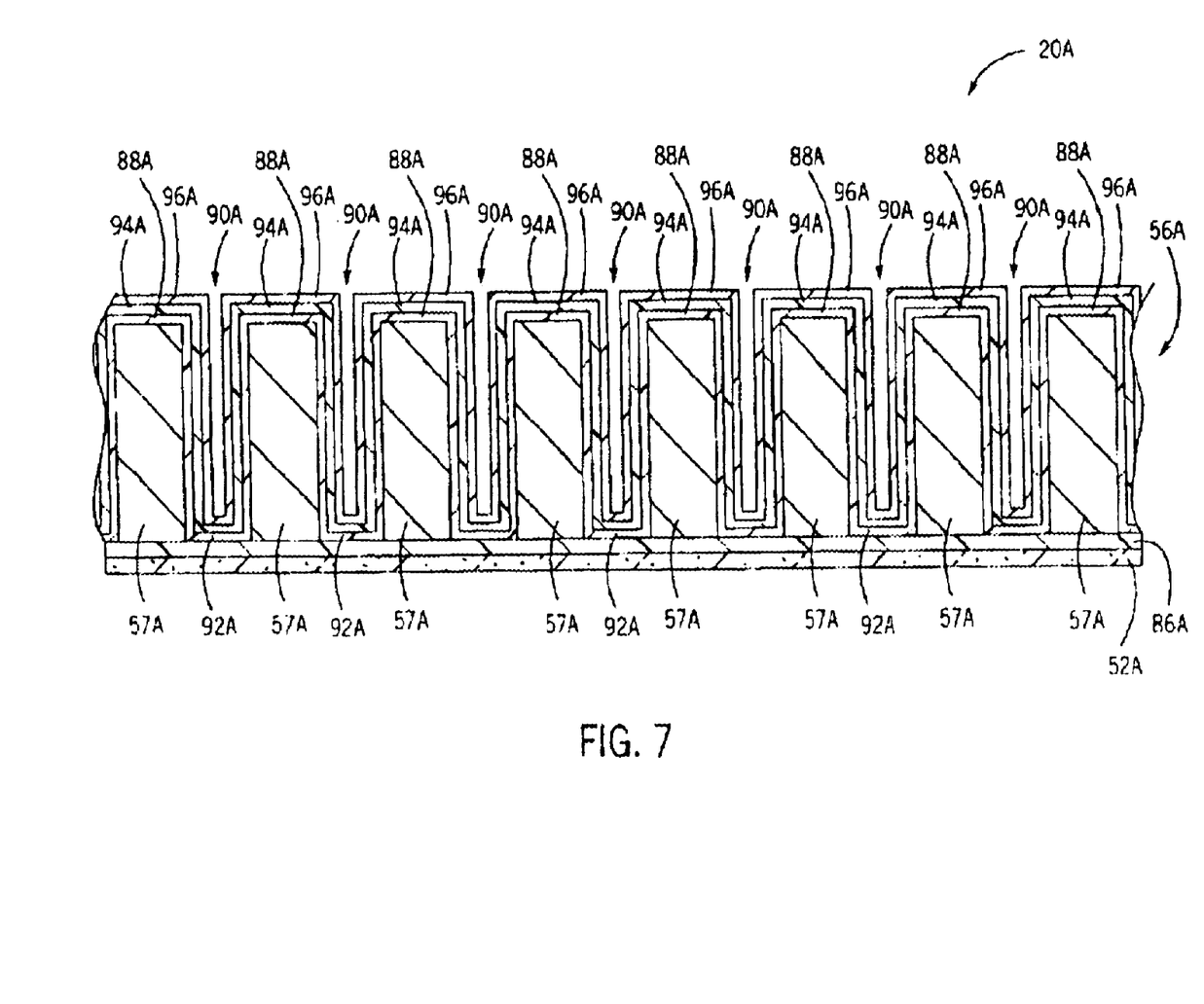
FIG. 7 is a cross-sectional schematic of a CT detector in accordance with another embodiment of the present invention.

Referring now to FIG. 7, a CT detector 20a constructed in accordance with another embodiment of the present invention is shown. Similar to the detector of FIG. 6, detector 20a includes a plurality of scintillators 57a arranged in an array 56a that is coupled to a photodiode arry 52a with an optical coupler 86a. A cast reflector 88a is used to coat each of the scintillators and is designed to absorb cross-talk emissions between scintillators 57a. In contrast to the detector of FIG. 6, detector 20a incorporates a thin layer of low index material 94a coating reflector 88a. A reflective layer 96a is then affixed to the low index material layer 94a. The low index layer 94a and the reflective material layer 96a operate to improve the reflectively and reduce cross talk between scintillators 57a. Silver is one material that is well suited for implementation as the reflective layer 96a. Detector 20a also is constructed with an air gap 90a being disposed between each of the scintillators, Air gap 90a inproves the reflectivity of light between scintillators 57a.

A number of fabrication techniques may be used to construct a CT detector similar to that shown in FIGS. 6 and 7. One such method includes the casting of titanium dioxide laden epoxy between scintillators. Depending upon the particular detector, the reflector may be disposed along one or two dimensions. That is, the epoxy may be cast such that a reflector is fabricated along an x-axis, a z-axis, or both. Once the cast reflector is deposited between the scintillators, the cast reflector is diced to created air gaps. These air gaps or spaces may be made with any number of cutting techniques. In one embodiment, the reflector is left with the dissected air gaps to form the CT detector of FIG. 6. Alternately, the air gaps may be subsequently coated with a low index material or resin followed by a coat or film of reflective material to form the CT detector of FIG. 7. Both of these methodologies produce a reflector having improved light collection efficiency by the photodiode and lower cross-talk. As stated above, it is preferred that the reflector be fabricated from a material absent chromium oxide to improve cross-talk absorption.

Figure 8:
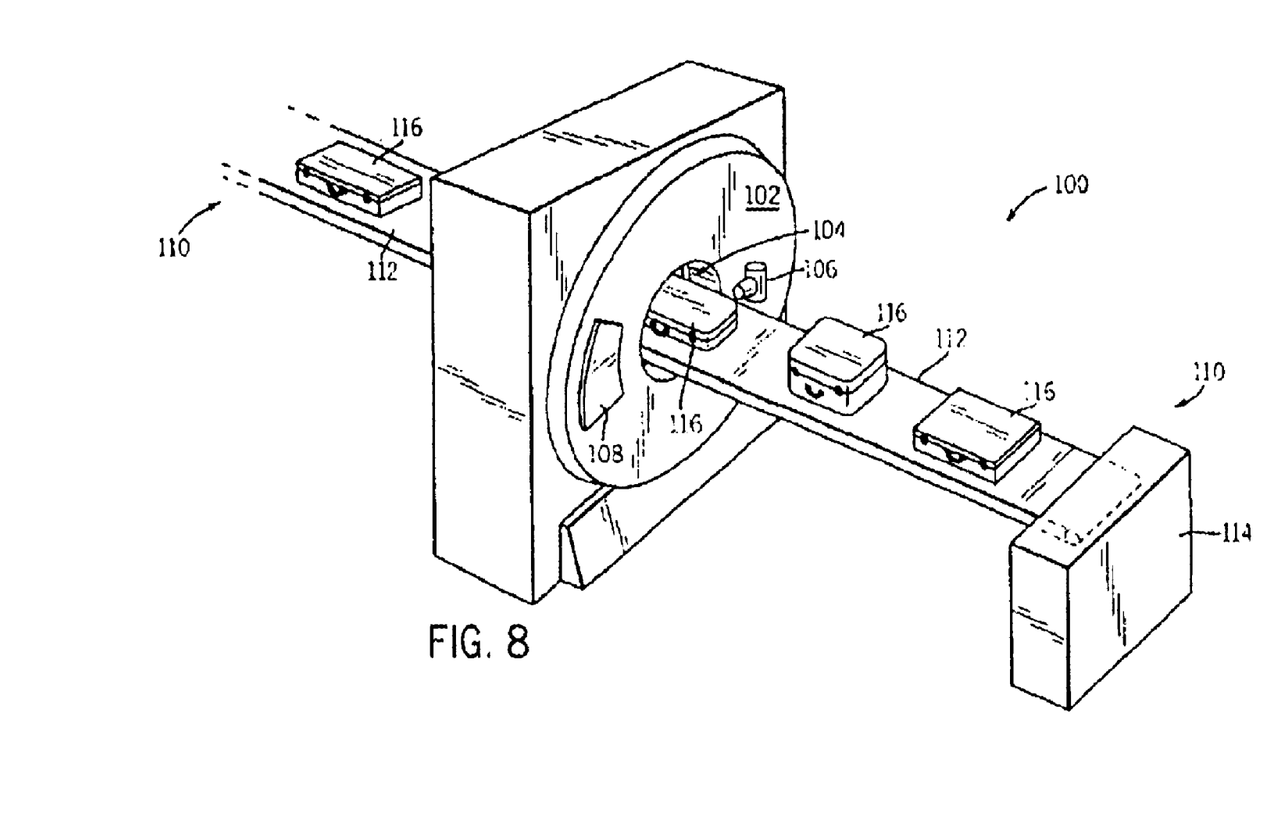
FIG. 8 is a pictorial view of a CT system for use with a non-invasive package inspection system.

Referring now to FIG. 8, package/baggage inspection system 100 includes a rotatable gantry 102 having an opening 104 therein through which packages or pieces of baggage may pass. The rotatable gantry 102 houses a high frequency electromagnetic energy source 106 as well as a detector assembly 108 having scintillator arrays comprised of scintillator cells similar to that shown in FIGS. 6 or 7. A conveyor system 110 is also provided and includes a conveyor belt 112 supported by structure 114 to automatically and continuously pass packages or baggage pieces 116 through opening 104 to be scanned. Objects 116 are fed through opening 104 by conveyor belt 112, imaging data is then acquired, and the conveyor belt 112 removes the packages 116 from opening 104 in a controlled and continuous manner. As a result, postal inspectors, baggage handlers, and other security personnel may non-invasively inspect the contents of packages 116 for explosives, knives, guns, contraband, etc.

Therefore, in accordance with one embodiment of the present invention, a CT detector includes a scintillator array of scintillators arranged to receive x-rays from an x-ray projector source and output light in proportion to the x-rays received. The detector further includes a cast reflector integrally disposed between adjacent scintillators. An air gap is disposed within the cast reflector such that a space or void is formed between adjacent scintillators.

In accordance with another embodiment of the present invention, a CT detector having a scintillator array optically coupled to a photodiode array is provided. The CT detector is formed by creating voids between adjacent scintillators of the scintillator array and disposing a cast reflector within each of the voids. Air gaps are then created in the cast reflector disposed within the voids. A photodiode array is then coupled to the scintillator array to form a CT detector.

According to another embodiment of the present invention, a CT system includes a rotatable gantry having a bore centrally disposed therein and a table movable fore and aft through the bore and configured to position a subject for CT data acquisition. The CT system further includes a high frequency electromagnetic energy projection source positioned within the rotatable gantry and configured to project high frequency electromagnetic energy toward the subject. A detector array is provided and disposed within the rotatable gantry and configured to detect high frequency electromagnetic energy projected by the projection source and impinged by the subject. The detector array includes a scintillator array having a plurality of scintillators and wherein the scintillator array includes a reflector between adjacent scintillators. The reflector is configured to have an integrated air gap. The detector array further includes a photodiode array coupled to the scintillator array and configured to produce electrical signals in response to light emitted by the scintillator array.

In accordance with yet a further embodiment of the present invention, a scintillator array includes a plurality of scintillators arranged to receive x-rays and generate light in response thereto. The scintillator array further includes a reflector disposed between adjacent scintillators and a plurality of voids integrated in the reflector along at least one dimension. The reflector is formed of a material absent chromium oxide.

In accordance with another embodiment of the present invention, a method of manufacturing a scintillator array includes the steps of creating voids between adjacent scintillators. The method further includes disposing a cast reflector within each of the voids and creating air gaps in the cast reflector.

The present invention has been described in terms of the preferred embodiment, and it is recognized that equivalents, alternatives, and modifications, aside from those expressly stated, are possible and within the scope of the appending claims.

What is claimed is:

1. A CT detector comprising:
    a scintillator array of scintillator elements arranged to receive x-rays from an x-ray projection source and output light in proportion to the x-rays received;
    a cast reflector integrally disposed between adjacent scintillators of the scintillator array; and
    a single air gap disposed within the cast reflector such that a single space is formed between adjacent scintillators of the scintillator array.

2. The CT detector of claim 1 further comprising a low index material coating the cast reflector.

3. The CT detector of claim 2 further comprising reflective material coating the low index material.

4. The CT detector of claim 1 wherein the cast reflector includes an epoxy doped with $TiO_2$.

5. The CT detector of claim 1 absent $CT_2O_3$.

6. The CT detector of claim 1 wherein the air gap is defined by a U-shaped channel.

7. The CT detector of claim 6 further comprising a photodiode array of photodiodes optically coupled to the scintillator array via an optical coupler.

8. The CT detector of claim 7 wherein the U-shaped channel fails to extend to the optical coupler.

9. A CT detector having a scintillator array optically coupled to a photodiode array, the CT detector formed by:
    creating voids between adjacent scintillators of the scintillator array;
    disposing a cast reflector within each of the voids;
    creating a single air gap in the cast reflector between adjacent scintillators; and
    coupling the photodiode array to the scintillator array.

10. The CT detector of claim 9 wherein creating air gaps in the cast reflector includes dicing the cast reflector.

11. The CT detector of claim 9 further farmed by depositing a low index material in the air gaps.

12. The CT detector of claim 11 further formed by coating the low index material with a reflective material.

13. The CT detector of claim 12 wherein the reflective material includes silver.

14. The CT detector of claim 9 further formed by doping the cast reflector with $TiO_2$ prior to disposal of the cast reflector in the voids.

15. The CT detector of claim 9 wherein the cast reflector is an epoxy.

16. The CT detector of claim 9 wherein the cast reflector is absent of $Cr_2O_3$.

17. A CT system comprising:
    a rotatable gantry having a bore centrally disposed therein;
    a table movable fore and aft through the bore and configured to position a subject for CT data acquisition;
    a high frequency electromagnetic energy projection source positioned within the rotatable gantry and configured to project high frequency electromagnetic energy toward the subject; and
    a detector array disposed within the rotatable gantry and configured to detect high frequency electromagnetic energy projected by the projection source and impinged by the subject, the detector array including:
        a scintillator array having a plurality of scintillators and wherein the scintillator array includes a reflector between adjacent scintillators, the reflector directly contacting the plurality of scintillators and having an integrated air gap; and
        a photodiode array coupled to the scintillator array and configured to produce electrical signals in response to light emitted by the scintillator army.

18. The CT system of claim 17 wherein the reflector further includes a layer of epoxy.

19. The CT system of claim 18 wherein the reflector further includes a coating of low index material.

20. The CT system of claim 19 wherein The reflector further includes a layer of silver coating the low index material.

21. The CT system of claim 17 incorporated into at least one of a medical imaging scanner and a parcel inspection apparatus.

22. A scintillation array comprising:
    a plurality of scintillators arranged to receive x-rays and generate light in response thereto;
    a reflector disposed between adjacent scintillators;
    a plurality of voids integrated in the reflector along at least one dimension such that a single void is disposed between adjacent scintillators along the at least one dimension; and
    the reflector formed of a material absent $Cr_2O_3$.

23. The scintillator array of claim 22 further comprising a coating of low index material on the reflector.

24. The scintillator array of claim 23 further comprising a coating of reflective material on the low index material.

25. The scintillator amy of claim 22 further comprising a U-shaped air channel disposed in the reflector.

26. A method of manufacturing a scintillator array comprising the steps of:
    creating voids between adjacent scintillators of the scintillator array;
    depositing a cast reflector within each of the voids such that the cast reflector directly contacts the scintillators;
    creating air gaps in the cast reflector disposed within the voids; and
    coupling the photodiode array to the scintillator array.

* * * * *

UNITED STATES PATENT AND TRADEMARK OFFICE
CERTIFICATE OF CORRECTION

PATENT NO. : 6,947,517 B2
DATED : September 20, 2005
INVENTOR(S) : Hoffman

It is certified that error appears in the above-identified patent and that said Letters Patent is hereby corrected as shown below:

Column 7,
Line 31, delete "$CT_2O_3$" and substitute -- $Cr_2O_3$ --;
Line 50, delete "farmed" and substitute -- formed --;

Column 8,
Line 23, delete "army" and substitute -- array --;
Line 28, delete "The", second occurrence, and substitute -- the --;
Line 47, delete "amy" and substitute -- array --.

Signed and Sealed this

Thirty-first Day of January, 2006

JON W. DUDAS
*Director of the United States Patent and Trademark Office*